US006882470B2

United States Patent
Bloedorn et al.

(10) Patent No.: US 6,882,470 B2
(45) Date of Patent: Apr. 19, 2005

(54) MICROSCOPE HAVING A CONTRAST-INCREASING IMAGE A ACQUISITION APPARATUS

(75) Inventors: Jochen Bloedorn, Giessen (DE); Helmut Ruehl, Giessen (DE)

(73) Assignee: Leica Microsystems Wetzlar GmbH, Wetzlar (DE)

( * ) Notice: Subject to any disclaimer, the term of this patent is extended or adjusted under 35 U.S.C. 154(b) by 119 days.

(21) Appl. No.: 10/255,488

(22) Filed: Sep. 26, 2002

(65) Prior Publication Data

US 2003/0063377 A1 Apr. 3, 2003

(30) Foreign Application Priority Data

Sep. 28, 2001 (DE) .......................................... 101 48 188

(51) Int. Cl.⁷ .............................................. G02B 21/06
(52) U.S. Cl. ...................... 359/387; 359/389; 359/390; 359/391
(58) Field of Search ................................ 359/387–391, 359/363–370; 250/235, 310

(56) References Cited

U.S. PATENT DOCUMENTS

| 4,582,191 | A | * | 4/1986 | Weigand | .................. 198/339.1 |
| 6,028,306 | A | * | 2/2000 | Hayashi | ...................... 250/235 |
| 6,528,787 | B1 | * | 3/2003 | Katagami et al. | ........... 250/310 |
| 6,754,003 | B1 | * | 6/2004 | Engelhardt | .................. 359/389 |

FOREIGN PATENT DOCUMENTS

EP          0 810 457          12/1997

* cited by examiner

*Primary Examiner*—Mohammad Sikder
(74) *Attorney, Agent, or Firm*—Simpson & Simpson, PLLC

(57) ABSTRACT

The invention concerns a microscope having an image sensor (5) for recording the microscope images. The specimen (3) to be examined can be scanned by means of a stop (2) in the beam path of the illumination unit and a positioning unit which moves the specimen (3) or the stop (2). Opening the stop (2) or removing it from the beam path permits the entire image to be scanned with the image sensor (5).

14 Claims, 2 Drawing Sheets

MICROSCOPE HAVING A CONTRAST-INCREASING IMAGE ACQUISITION APPARATUS

CROSS REFERENCE TO RELATED APPLICATIONS

This application claims priority of the German patent application 101 48 188.8 which is incorporated by reference herein.

FIELD OF THE INVENTION

The invention concerns a microscope that is equipped with an image sensor for recording and storing the microscope images. A plurality of different image recording apparatuses for microscopes are known. Usually a video camera is connected to the observation beam path. Video cameras of this kind at present usually have two-dimensional image sensors, so that the entire image is recorded in one operation.

BACKGROUND OF THE INVENTION

These video cameras are easy to operate and quickly furnish a good-quality image. The disadvantage of these cameras, however, is that the image quality is impaired by aberrations in the optics and by flare. Scanning microscopes, for example, are used to eliminate these disadvantages. One such microscope is described in EP-A-0 810 457. The disadvantage of such an apparatus is that image scanning takes a relatively long time, so that alignment of the image area and correct focusing also represent time-consuming processes.

Combining the two systems into a single microscope requires additional optical means, for example beam splitters. In addition, two image sensors (one for area scanning and a second for point scanning) are necessary. Considerable costs are thus incurred here.

SUMMARY OF THE INVENTION

It is the object of the invention to describe an economical microscope which selectably gives a rapid overview of the image or permits high-resolution scanning of the image.

The principal claim indicates the manner in which this object is achieved. Developments of the invention are the subject matter of the dependent claims.

According to the present invention, a microscope is equipped with an illumination device and with a two-dimensional image sensor having an additional stop. Said stop can be selectably brought into the beam path. If the stop is open or is outside the beam path, the entire image can then be sensed using the image sensor. If the stop is introduced into the beam path or if a stop already present in the beam path is used with the exception of one or more small openings which, for example, can be point-like or slit-shaped, light will then fall only onto the region or regions of the image sensor corresponding to the stop openings.

Also provided is a positioning unit which permits scanning of the desired image area. For that purpose, it selectably moves the specimen or its specimen carrier or the stop. The image sensor can also be moved. By appropriate evaluation and sensing of the image points and correct arrangement thereof in a memory, the entire image can then be reassembled.

The arrangement according to the present invention thus combines the advantages of a planar image sensor which makes possible rapid imaging of the desired image area, and a high-resolution point-by-point scan. The use of the same image sensors in the same beam path for both operating modes yields an economical arrangement.

In a particularly advantageous embodiment of the invention, the stop possesses a slit-shaped opening. Said opening is preferably at least as long as one side of the area to be imaged. Scanning is then preferably performed perpendicular to the longitudinal extension of the slit. The entire image can thus be scanned by way of a motion in only one axis.

In a further advantageous embodiment of the invention, the stop possesses a point-like opening. Here a motion in two axes (i.e. in the plane) is necessary in order to scan the entire area that is to be imaged.

A further advantageous embodiment of the invention consists in the fact that the stop possesses several stop openings. Said stop openings are preferably of point-like configuration and possess a sufficient spacing from one another that no overlap of flare occurs between the images of the individual stop openings. As a result, several image points of the sensor are exposed simultaneously in one step. The overall acquisition time of an image is also correspondingly reduced. For example, in the case of ten stop openings which thus simultaneously expose ten image points simultaneously, the overall recording time can be decreased by a factor of ten.

In a further advantageous embodiment of the invention, the stop opening is configured in such a way that it approximately corresponds, in one or two axes, to the size of one image point of the image sensor. In the case of a slit-shaped stop, for example, the width of the stop corresponds to one image point of the image sensor. In the case of a point-like stop, the length and width of the stop opening correspond to the length and width, respectively, of one image point of the sensor. It is thereby possible effectively to prevent flare from being sensed by the image sensor, since only exactly one image point of the image sensor is illuminated. Optimum light efficiency is only achieved, however, with very precise alignment of the stop opening and image sensor. To allow at least slight tolerances in this context, it is advantageous if the stop opening is dimensioned slightly larger than one image point on the image sensor.

A further advantageous embodiment of the invention consists in the fact that an additional evaluation unit is present. The purpose of this evaluation unit is to analyze and process the image data of the image sensor. It thus ascertains the correct position of the individual image points from the image of the stop on the image sensor, and transmits to the memory unit the respective image values of the center image point on the image sensor. As a result, it is not necessary to transmit the present position of the specimen to the memory unit, since that can be obtained from the data of the two-dimensional image sensor. This also makes possible scanning with a highly tolerance-affected positioning unit. It is also possible to use, instead of a positioning unit that activates individual positions in each case, a drive which implements a continuous motion of the specimen.

BRIEF DESCRIPTION OF THE DRAWINGS

The invention will be described by way of example below, with no limitation of the general idea of the invention, based on exemplary embodiments and with reference to the drawings, in which.

DETAILED DESCRIPTION OF THE INVENTION

Figure 1:
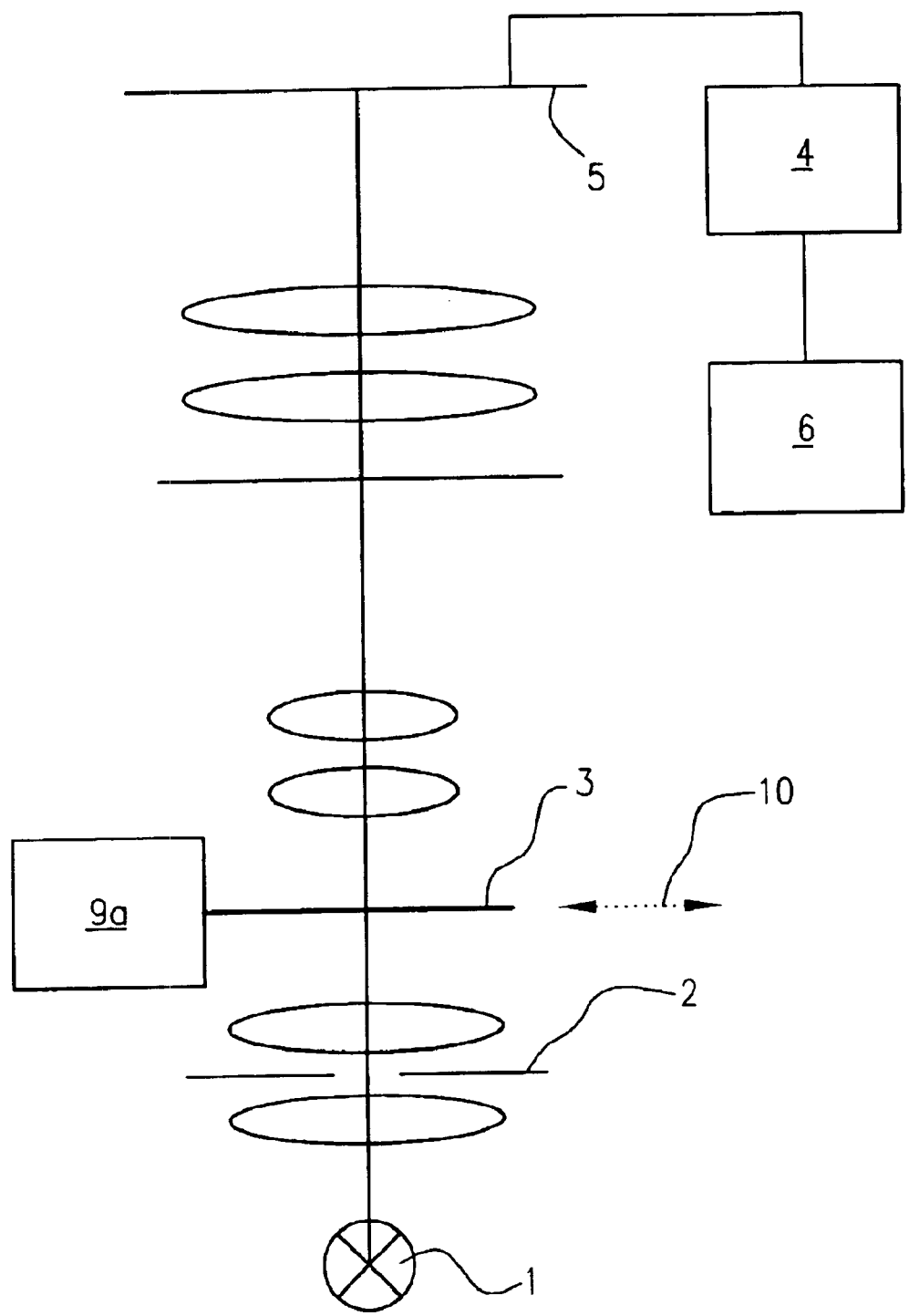
FIG. 1 schematically depicts the invention, the specimen being moved.

FIG. 1 schematically depicts an arrangement according to the present invention in general and highly simplified form. The light of a light source 1 is incident via a stop 2 on specimen 3, and is imaged via further lens systems onto image sensor 5. The latter is connected to a memory unit 4, and that in turn to an evaluation unit 6. Specimen 3 can be moved in the plane of arrow (10). It should be appreciated that although arrow (10) only depicts one axis of movement, positioning unit (9a) is capable of scanning an area. i.e., scanning in two axes. Since the lens systems arranged between specimen 3 and image sensor 5 are known per se, they have been inserted into FIGS. 1 and 2 without reference characters and without more detailed explanation.

Figure 2:
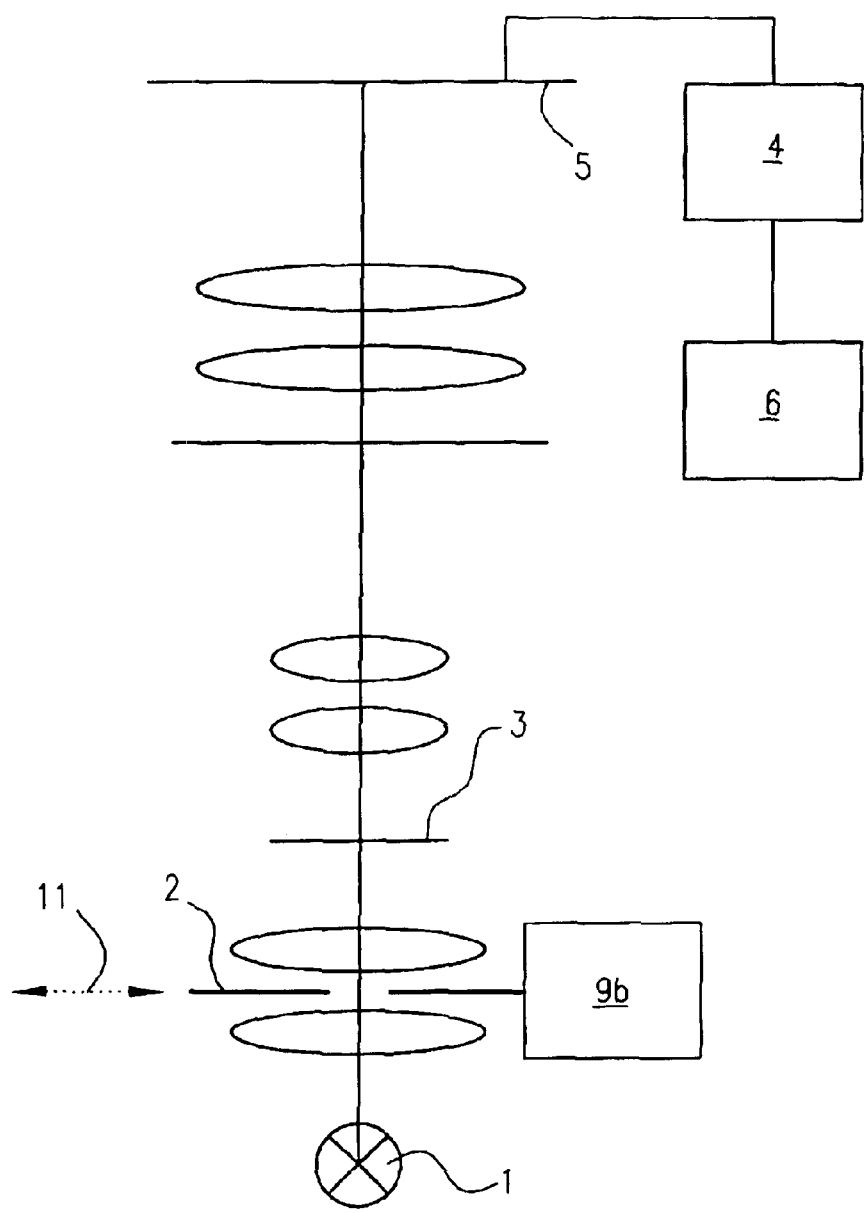
FIG. 2 schematically depicts the invention, the stop being moved.

FIG. 2 shows an arrangement similar to that in FIG. 1, only stop 2 being moved in this case. This is again illustrated by arrow (11). As previously mentioned, it should be appreciated that although arrow (11) only depicts one axis of movement, positioning unit (9b) is capable of scanning an area, i.e., scanning in two axes.

Figure 3A:
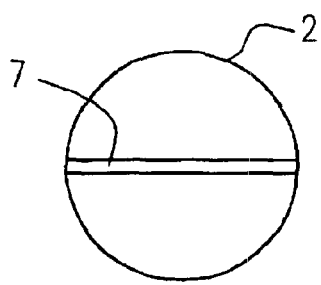
FIG. 3a shows a stop with a slit.
Figure 3B:
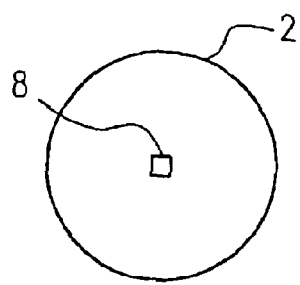
FIG. 3b shows a stop with a point-like opening.
Figure 3C:
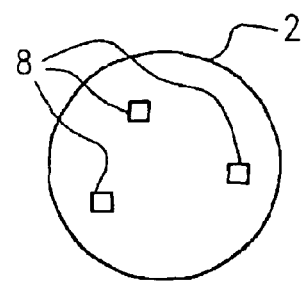
FIG. 3c shows a stop with several openings.

FIGS. 3a, 3b, 3c each show different embodiments of stop 2. FIG. 3a depicts a slit-shaped stop. This means that the upper and lower halves of the stop, with the exception of gap 7 positioned diametrically, are opaque. FIG. 3b depicts a point-like stop 8. With the exception of the centrally positioned "point-like" opening, stop 2 is opaque. FIG. 3c shows a stop having several "point-like" openings 8 for simultaneous exposure of several points.

The invention has been described in detail with particular reference to certain preferred embodiments thereof, but it will be understood that variations and modifications can be effected within the spirit and scope of the invention.

PARTS LIST

1 Light source
2 Stop
3 Specimen
4 Memory/memory unit
5 Image sensor
6 Evaluation unit
7 Gap of (2)
8 Point-like opening(s) of (2)
9a Positioning unit
9b Positioning unit
10 Direction of motion arrow of (3)
11 Direction of motion arrow of (2)

What is claimed is:

1. A microscope comprising an illumination device and a two-dimensional image sensor for electronic sensing of a microscopic image of a specimen on a specimen carrier, wherein the illumination device comprises a stop that can be selectably brought into a beam path; positioning means for scanning operatively arranged to move the specimen, its specimen carrier, and the stop in the beam path in such a way that the area of the specimen to be examined is scanned by a light beam passing through the stop; and memory means for storing image data during scanning so that the image data can be retrieved after scanning.

2. The microscope as defined in claim 1, wherein the stop comprises a slit-shaped stop opening that extends from one side of the area to be imaged to the opposite side, and scanning is accomplished in an axis perpendicular to the longitudinal axis of the stop opening.

3. The microscope as defined in claim 1, wherein the stop comprises one point-like stop opening, and scanning is accomplished over the surface of the area of the specimen to be examined.

4. The microscope as defined in claim 1, wherein the stop comprises a plurality of point-like stop openings.

5. The microscope as defined in claim 2 wherein the size and width of the stop opening corresponds approximately to the size and width of one image point of an image sensor.

6. The microscope as defined in claim 3 wherein the size and width of the stop opening corresponds approximately to the size and width of one image point of an image sensor.

7. The microscope as defined in claim 4 wherein the size and width of the stop openings correspond approximately to the size and width of one image point of an image sensor.

8. The microscope as defined in claim 5 further comprising an analysis unit operatively arranged to analyze the image of the stop on the image sensor and evaluate the image data of the image point or points that lie in the center of the imaged image point or points and forward them to the memory means for storage.

9. The microscope as defined in claim 6 further comprising an analysis unit operatively arranged to analyze the image of the stop on the image sensor and evaluate the image data of the image point or points that lie in the center of the imaged image point or points and forward them to the memory means for storage.

10. The microscope as defined in claim 7 further comprising an analysis unit operatively arranged to analyze the image of the stop on the image sensor and evaluate the image data of the image point or points that lie in the center of the imaged image point or points and forward them to the memory means for storage.

11. A microscope as recited in claim 1 wherein said positioning means comprises means for moving said specimen within said beam path.

12. A microscope as recited in claim 1 wherein said positioning means comprises means for moving said specimen carrier with its engaged specimen within said beam path.

13. A microscope as recited in claim 1, wherein said positioning means comprises means for moving said stop within said beam path.

14. A microscope as recited in claim 1, wherein said positioning means comprises means for moving said specimen and said stop within said beam path.

* * * * *

UNITED STATES PATENT AND TRADEMARK OFFICE
CERTIFICATE OF CORRECTION

| | | |
|---|---|---|
| PATENT NO. | : 6,882,470 B2 | Page 1 of 1 |
| APPLICATION NO. | : 10/255488 | |
| DATED | : April 19, 2005 | |
| INVENTOR(S) | : Jochen Bloedorn and Helmut Ruehl | |

It is certified that error appears in the above-identified patent and that said Letters Patent is hereby corrected as shown below:

Title page, Item [54] and Column 1, line 1,
Title, delete "MICROSCOPE HAVING A CONTRAST-INCREASING IMAGE A ACQUISITION APPARATUS" add -- MICROSCOPE HAVING A CONTRAST-INCREASING IMAGE ACQUISITION APPARATUS --.

Signed and Sealed this

Twentieth Day of June, 2006

JON W. DUDAS
*Director of the United States Patent and Trademark Office*